US010380508B2

(12) United States Patent
Prismon et al.

(10) Patent No.: US 10,380,508 B2
(45) Date of Patent: Aug. 13, 2019

(54) SELF-CONTAINED DECISION LOGIC

(71) Applicant: FAIR ISAAC CORPORATION, Roseville, MN (US)

(72) Inventors: Joshua Prismon, Lafayette, CO (US); Andrei Palskoi, Parkland, FL (US); Andrew K. Holland, San Jose, CA (US); Fernando Felipe Campos Donati Jorge, Saratoga, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 277 days.

(21) Appl. No.: 15/496,852

(22) Filed: Apr. 25, 2017

(65) Prior Publication Data
US 2017/0308822 A1 Oct. 26, 2017

Related U.S. Application Data

(60) Provisional application No. 62/327,394, filed on Apr. 25, 2016, provisional application No. 62/327,390, filed on Apr. 25, 2016.

(51) Int. Cl.
*G06Q 10/04* (2012.01)
*G06F 16/11* (2019.01)
(Continued)

(52) U.S. Cl.
CPC ............. *G06Q 10/04* (2013.01); *G06F 11/14* (2013.01); *G06F 11/16* (2013.01); *G06F 16/128* (2019.01);
(Continued)

(58) Field of Classification Search
CPC .......... G06Q 10/04; G06N 5/04; G06N 5/043; G06N 5/02; G06F 17/2282; G06F 11/16; G06F 11/14; G06F 16/9027; G06F 16/128
(Continued)

(56) References Cited

U.S. PATENT DOCUMENTS 5,497,334 A * 3/1996 Russell ............... G06F 17/5022
716/52
5,517,645 A * 5/1996 Stutz ....................... G06F 9/449
719/316
(Continued)

OTHER PUBLICATIONS

Lau, Kung-Kiu, et al., "Software Component Models", IEEE Transactions on Software Engineering, vol. 33, No. 10, Oct. 2007, pp. 709-724.*
Hatcliff, John, et al., "Cadena: An Integrated Development, Analysis, and Verification Environment for Component-based Systems", ICSE '03, Portland, OR, May 3-10, 2003, 13 pages.*
(Continued)

*Primary Examiner* — Robert Stevens
(74) *Attorney, Agent, or Firm* — Mintz Levin Cohn Ferris Glovsky and Popeo, P.C.

(57) ABSTRACT

In one aspect there is provided a method. The method may include generating a graphical representation of a decision logic underlying a solution, the graphical representation having a plurality of nodes. A component archetype can be identified. The identified component archetype can support generating a function implementing one of the plurality of nodes in the graphical representation of the solution. An instance of the component can be generated based at least on the component archetype. The function can be generated by invoking the instance of the component. The generated function can be hosted by the instance of the component. Alternately and/or additionally, the generation function can be copied into one or more separate execution environments. Systems and articles of manufacture, including computer program products, are also provided.

20 Claims, 7 Drawing Sheets

(51) Int. Cl.
*G06F 16/901* (2019.01)
*G06F 11/14* (2006.01)
*G06F 11/16* (2006.01)
*G06F 17/22* (2006.01)
*G06N 5/02* (2006.01)
*G06N 5/04* (2006.01)
*G06Q 20/40* (2012.01)

(52) U.S. Cl.
CPC ...... *G06F 16/9027* (2019.01); *G06F 17/2282* (2013.01); *G06N 5/02* (2013.01); *G06N 5/043* (2013.01); *G06N 5/04* (2013.01); *G06Q 20/4016* (2013.01)

(58) Field of Classification Search
USPC .......................................................... 707/603
See application file for complete search history.

(56) References Cited

U.S. PATENT DOCUMENTS

| | | | |
|---|---|---|---|
| 6,615,199 B1* | 9/2003 | Bowman-Amuah | G06F 9/449 706/50 |
| 6,931,599 B1* | 8/2005 | Korenshtein | G06F 9/4492 715/762 |
| 7,272,820 B2* | 9/2007 | Klianev | G06F 8/34 717/101 |
| 7,665,064 B2* | 2/2010 | Able | G06F 16/95 717/117 |
| 8,386,525 B2* | 2/2013 | Pace | G06F 8/60 707/796 |
| 8,417,938 B1 | 4/2013 | Considine et al. | |
| 9,588,790 B1 | 3/2017 | Wagner et al. | |
| 9,690,575 B2 | 6/2017 | Prismon et al. | |
| 2002/0104068 A1* | 8/2002 | Barrett | G06F 8/24 717/104 |
| 2005/0085937 A1 | 4/2005 | Goodwin et al. | |
| 2005/0278348 A1 | 12/2005 | Falter et al. | |
| 2007/0220022 A1* | 9/2007 | Lankinen | G06F 16/258 |
| 2008/0172673 A1 | 7/2008 | Naik | |
| 2008/0209392 A1* | 8/2008 | Able | G06F 8/34 717/105 |
| 2010/0306772 A1 | 12/2010 | Arnold et al. | |
| 2010/0333083 A1 | 12/2010 | Chancey et al. | |
| 2012/0185821 A1* | 7/2012 | Yaseen | G06F 8/10 717/105 |
| 2013/0006707 A1 | 1/2013 | Ssubhanjan | |
| 2013/0239089 A1 | 9/2013 | Eksten et al. | |
| 2014/0052773 A1 | 2/2014 | Deng et al. | |
| 2014/0075032 A1 | 3/2014 | Vasudevan et al. | |
| 2014/0244799 A1 | 8/2014 | Kundgol et al. | |
| 2014/0278807 A1 | 9/2014 | Bohacek | |
| 2015/0067171 A1 | 3/2015 | Yum et al. | |
| 2015/0156280 A1 | 6/2015 | Vaswani et al. | |
| 2015/0205602 A1 | 7/2015 | Prismon et al. | |

OTHER PUBLICATIONS

*Decision Model and Notation.* Object Management Group, 2015. 182 pages.

Jayasinghe, Deepal, et. al. "Improving Performance and Availability of Services Hosted on IaaS Clouds with Structural Constraint-Aware Virtual Machine Placement." *2011 International Conference on Services Computing*, IEEE. pp. 72-79.

Li, Jim, et. al. "Fast Scalable Optimization to Configure Service Systems Having Cost and Quality of Service." *Proceedings of the 6th International Conference on Automatic Computing*, Jun. 15-19, 2009, Barcelona Spain, pp. 159-168.

* cited by examiner

SELF-CONTAINED DECISION LOGIC

RELATED APPLICATION

This application claims priority to U.S. Provisional Application No. 62/327,394 entitled SYSTEM AND METHOD FOR DECOMPOSING SOFTWARE COMPONENT INTO STANDALONE FUNCTIONS and filed on Apr. 25, 2016, and U.S. Provisional Application No. 62/327,390 entitled SYSTEM AND METHOD FOR TRANSFORMING A DECISION MANAGEMENT NOTATION GRAPH INTO A FUNCTIONING DISTRIBUTED PROCESS and filed on Apr. 25, 2016, the disclosures of which are incorporated herein by reference in their entirety.

TECHNICAL FIELD

The subject matter described herein relates generally to portable applications and more specifically to techniques for packaging decision logic into software containers.

BACKGROUND

The development of analytic decision applications tends to a time and resource intensive endeavor. An analytic decision application is typically developed by analytic scientists in a familiar language that is optimized for mathematical modeling. Thereafter, the application is rewritten in an enterprise language (e.g., JAVA) in order to integrate with outside security systems as well as to enable monitoring, reporting, and data access. In addition, the application must be configured for deployment and integration with pre-existing information technology (IT) infrastructure. This conventional development process restricts the application to a specific deployment environment while deployment to a different environment will require a repeat of the entire process. After full deployment and running of the application, captured operational and decision metrics, which allow for improvement of the application, have to be manually propagated back to the analytic scientists that originally developed the technology. As such, conventional analytic decision applications lack cross-platform compatibility and are therefore prone to vendor lock-in. Furthermore, data that is generated by conventional analytic decision applications must be transferred back separately.

SUMMARY

Systems, methods, and articles of manufacture, including computer program products, are provided for deploying self-contained decision logic. In some example embodiments, there is provided a method. The method can include: generating a graphical representation of a decision logic underlying a solution, the graphical representation having a plurality of nodes; identifying a component archetype that supports generating a function implementing one of the plurality of nodes in the graphical representation of the solution; generating, based at least on the component archetype, an instance of the component; generating the function by at least invoking the instance of the component, the generated function being hosted by the instance of the component; and deploying the generated function for execution in one or more runtime environments.

In some variations, one or more features disclosed herein including the following features can optionally be included in any feasible combination. The graphical representation can be generated in accordance with a Decision Model and Notation™ (DMN™) standard. The plurality of nodes can form a directed acyclic graph indicating one or more dependencies between the plurality of nodes. The function can implement a knowledge model. The knowledge model can include one or more predictive models, optimization algorithms, business and operational rules, decision trees, decisions tables, scorecards, and/or decision graphs.

In some variations, the instance of the component can host the function by serving as a software container that encapsulates program code associated with the function and a complete filesystem required for executing the function. The component archetype can include resources for instantiating the instance of the component, the resources including a descriptor file, one or more implementation artifacts, and documentation. The component archetype can be identified based at least on the descriptor file.

In some variations, the component archetype can further include programming code configured to generate the function. The invoking of the instance of the component can include executing the programming code configured to generate the function.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
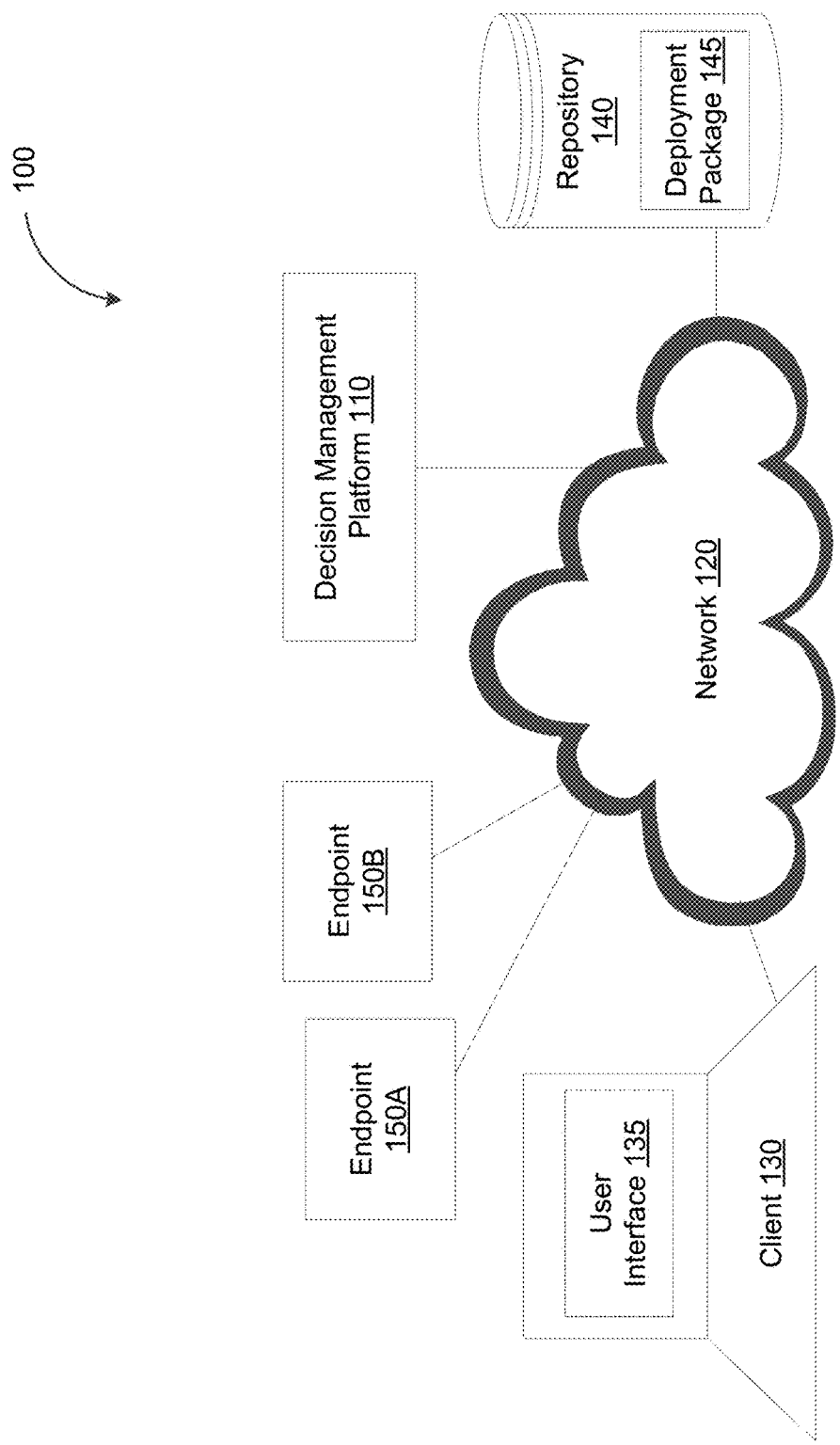
FIG. 1 depicts a system diagram illustrating a decision management system consistent with implementations of the current subject matter.

A solution can provide the data model and decision logic for implementing an automated decision process in which an output value is generated based on one or more input values. In particular, the decision logic can specify one or more knowledge models for formulating the output value including, for example, predictive models, optimization algorithms, rulesets, decision trees, decisions tables, scorecards, decision graphs, and/or the like. However, conventional solutions are not configured for nimble deployment across different computing infrastructures such as, for example, distributed computing systems (e.g., Sparkm clusters), serverless computing platforms (e.g., Amazon® Web Services (AWS) Lambda), mobile devices (e.g., smartphones), physical embedded devices (Internet of Things), and/or the like. As such, in some implementations of the current subject matter, a decision management platform can support the definition, deployment, and management of one or more solutions including the accompanying knowledge models. Furthermore, the decision management platform can be configured to provide the solutions as one or more self-contained functions that can be deployed and executed in any runtime, regardless of the underlying computing infrastructure.

In some implementations of the current subject matter, the decision management platform can support the development of a solution by providing a corresponding graphical representation (e.g., Decision Model and Notation™ (DMN™)). For example, the decision logic of a solution can be represented by a directed acyclic graph having a plurality of nodes. Developing the solution can include modifying (e.g., adding, removing, and/or the like) the nodes and/or the edges connecting the nodes. Each node in the directed acyclic graph can correspond to a component that is configured to provide a user interface for configuring that component. For instance, a component can be associated with a knowledge model that can be defined and/or customized during the development of the solution. Furthermore, the component can be configured to host one or more corresponding functions such as, for example, a function implementing the knowledge model, a function providing a mechanism for fetching or saving data, and/or the like. Having a component host enables these functions to be deployed and executed in any runtime as part of a software container. As used herein, component and software container can be used interchangeably. It should be appreciated that a component or a software container (e.g., Docker on Linux or Windows, Oracle® Solaris Zone, and/or the like) can encapsulate the program code for the functions in a complete filesystem for running these functions. The complete filesystem can include, for example, the supporting dependencies and/or artifacts required to execute the functions. An artifact can refer to any tangible byproduct that is produced during the development of a function.

In some implementations of the current subject matter, the decision management platform can support the deployment of a solution to any runtime regardless of the underlying computing infrastructure. The solution can be deployed by publishing a snapshot of the solution, which can include a versioned collection of the components of the solution. This snapshot can be stored at a remote repository, such as Amazon® Simple Storage Service (S3), and/or a lock repository (e.g., a zip file on the local disk), from which the solution can be deployed to one or more runtimes. For instance, the solution can be deployed to a distributed computing system (e.g., a Spark® cluster) as a batch job configured to process a batch of input values. Alternately and/or additionally, the solution can be deployed as a web service hosted by a serverless platform (e.g., Amazon® Web Services Lambda) and/or as a mobile application on a mobile device.

In some implementations of the current subject matter, the decision management platform can control a snapshot over various stages of its lifecycle, which can include creation, submission, approval, and deployment. The lifecycle of the snapshot can be configured to be compliant with one or more regulatory schemes (e.g., Sarbanes Oxley). For example, one user can create a snapshot and subsequent submit the snapshot for approval. One or more other users can review the snapshot to ensure compliance before approving the snapshot. Once approved, the snapshot can be deployed into production in different runtimes such as, for example, a Spark cluster, Amazon® AWS Lambda, a mobile device, and/or an Internet of Things device. It should be appreciated that the stages of the lifecycle of a snapshot can be configured in any appropriate and/or desired manner. For instance, where there are no applicable regulatory schemes, the same user can create, submit, approve, and deploy a snapshot.

FIG. 1 depicts a system diagram illustrating a decision management system 100 consistent with implementations of the current subject matter. Referring to FIG. 1, the decision management system 100 can include a decision management platform 110. In some implementations of the current subject matter, the decision management platform 110 can be a Platform-as-a-Service (PaaS) that is deployable in a public and/or a public cloud setting. As shown in FIG. 1, the decision management platform 110 can be communicatively coupled, via a wired and/or wireless network 120, with a client 130 and a repository 140. The client 120 can be device that includes at least one processor and at least one memory including program code such as, for example, a computer, a tablet, a mobile device, a smart phone, and/or the like. The network 120 can be the Internet, a public land mobile network, a wireless local area network (WLAN), a wide area network (WAN), a point-to-point link, and/or the like.

In some implementations of the current subject matter, the decision management platform 110 can support the development of a solution by a user at the client 130. The decision management platform 110 can provide, to the client 130, a user interface 135 that is configured to display a graphical representation of the solution. As noted earlier, the graphical representation of the solution can be a directed acyclic graph having a plurality of nodes. The user can define the solution by interacting with the user interface 135 to modify (e.g., adding, removing, and/or the like) the nodes and/or the edges connecting the nodes.

Figure 2A:
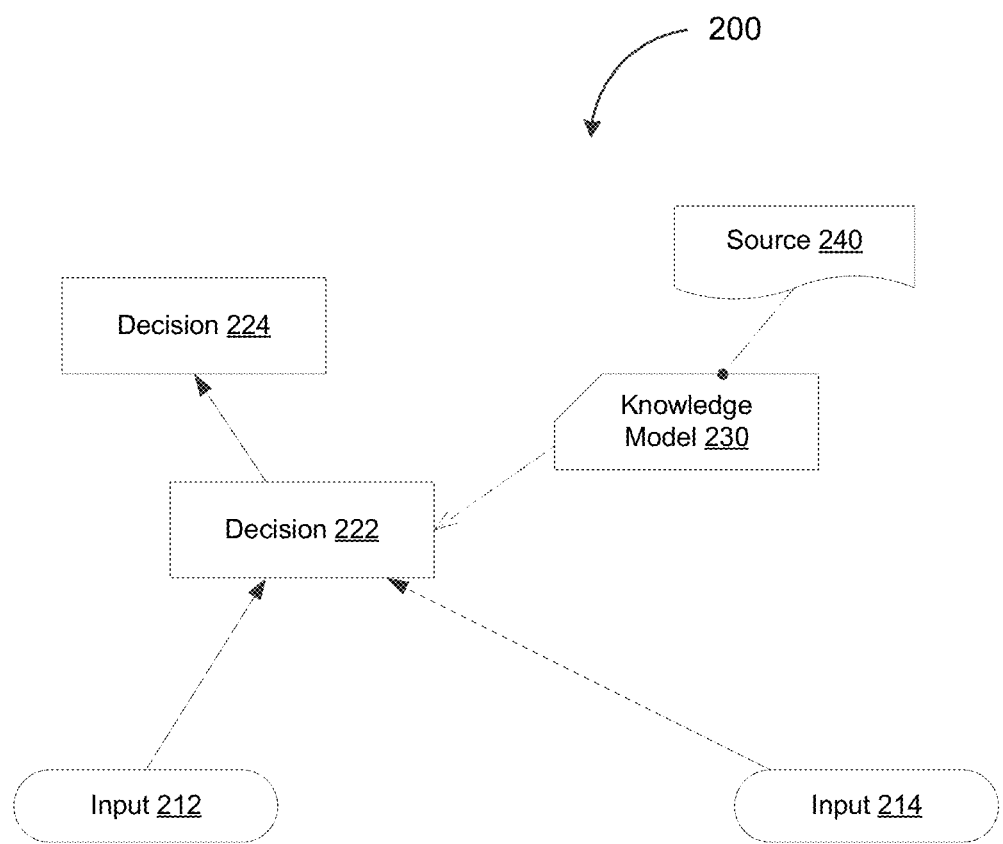
FIG. 2A depicts a graphical representation of a solution consistent with implementations of the current subject matter.

FIG. 2A depicts a graphical representation 200 of a solution consistent with implementations of the current subject matter. The graphical representation 200 can be a directed acyclic graph that is rendered in accordance with Decision Model and Notation™ (DMN™) and/or any other applicable standard. As shown in FIG. 2A, the graphical representation 200 of the solution can include a plurality of nodes that correspond to various elements of the decision logic underlying the solution. For instance, the graphical representation 200 can include nodes that correspond to a first input 212, a second input 214, a first decision 222, a second decision 224, a knowledge model 230, and a source 240. Furthermore, the plurality of nodes may be connected via edges indicating the dependencies between the various elements of the decision logic.

Referring to FIG. 2A, the directed edges from the first input 212 and the second input 214 to the first decision 222 can indicate that the first decision 222 requires both the first input 212 and the second input 214. Meanwhile, the directed edge from the first decision 222 to the second decision 224 can indicate that the second decision 224 requires output from the first decision 222. The directed edge from the knowledge model 230 to the first decision 222 indicates that the output of the first decision 222 can be formulated by applying the knowledge model 230 to the first input 212 and/or the second input 214. As noted earlier, the knowledge model 230 can include one or more predictive models, optimization algorithms, business and operational rules, decision trees, decisions tables, scorecards, decision graphs, and/or the like. Alternately and/or additionally, the edge between the source 240 and the knowledge model 230 can indicate that the source 240 is responsible for defining and/or maintaining the knowledge model 230.

To further illustrate, the graphical representation 200 can depict the decision logic for a solution for processing credit card transactions. The second decision 224 can be a decision to approve and/or deny a pending credit card transaction while the first decision 222 can be a decision on a risk of fraud associated with the pending credit card transaction. In accordance with the graphical representation 200, the decision to approve and/or deny a pending credit card transaction can require the output from the decision on the risk of fraud associated with the pending credit card transaction. For example, the pending credit card transaction may be denied in instances where the risk of fraud exceeds a threshold value. Meanwhile, the decision on the risk of fraud associated with the pending credit card transaction can require the first input 212 and the second input 214. The first input 212 can be customer information while the second input 214 can be transaction information. Furthermore, the decision on the risk of fraud associated with the pending credit card transaction can be made by applying the knowledge model 230 to the customer information and/or the transaction information. For example, the knowledge model 230 can be a decision tree that determines the risk of fraud associated with the pending credit card transaction based on a geographic location of the customer and/or the amount of the transaction. It should be appreciated that the solution can be defined by modifying one or more of the first input 212, the second input 214, the first decision 222, the second decision 224, the knowledge model 230, and/or the source 240. The modification can include customizing the knowledge model 230 to include a customized predictive model, optimization algorithm, ruleset, decision tree, decisions table, scorecard, decision graph, and/or the like.

In some implementations of the current subject matter, the decision management platform 110 can support the deployment of a solution by the client 130. For example, by interacting with the user interface 135, the client 130 can deploy the solution to any runtime, such as a first endpoint 150A and/or a second endpoint 150B, regardless of the underlying computing infrastructure. The decision management platform 110 can support the deployment of the solution to any runtime (e.g., the first endpoint 150A and/or the second endpoint 150B) by generating one or more components implementing the solution. Specifically, the decision management platform 110 can generate at least one function for each input node, decision node, and/or knowledge model node in the graphical representation of the solution. The functions associated with a node can be hosted by a corresponding component, which serves as a software container encapsulating the functions as well as the supporting dependencies and/or artifacts required to execute the functions.

According to some implementations of the current subject matter, a component that hosts one or more functions can be generated based on a corresponding component archetype. As used herein, a component archetype can be a template that includes the resources for instantiating a specific type of component. These resources can include, for example, a descriptor file (e.g., component.json), implementation artifacts (e.g., a Java WAR file), and/or documentation (e.g., a license file). The descriptor file can indicate the types of functions that are supported by the corresponding component. Specifically, the component archetype may include one or more function factories that are each configured to generate a specific type of function.

Each component can provide a standard interface (e.g., a function factory) that is capable of generating a specific type of function. In some implementations of the current subject matter, the decision management platform 110 can call the function factory with a request to provision a specific type of functions at a specific Web Service Path. The function factory can respond to the request by fulfilling the request from the decision management platform 110 and generate the specific type of function at the specific Web Service Path. Here, the function factory can generate the specific function and return, for example, the universal resource locator (URL) of the function. The decision management platform 110 as well as applications that use the decision management platform 110 can use the universal resource locator of the function to directly configure the function. Alternately and/or additionally, the function factory can respond to the request by indicating to the decision management platform 110 that the function factory cannot fulfill the request. In this latter case, the decision management platform 110 can create another component to generate and host that function.

Table I below depicts an example of a descriptor file that can be used by the decision management platform 110 to generate a specific type of function.

associated with the graphical representation 200. As such, the decision management platform 110 can generate one or more functions implementing the first input 212, the second input 214, the first decision 222, the second decision 224, and/or the knowledge model 230. For example, the decision management platform 110 can identify, based on the corresponding descriptor files, the component archetype that can be used to generate the function for implementing the knowledge model 230. The decision management platform 110 can generate an instance of the component to host the function for implementing the knowledge model 230. Fur-

TABLE 1

```
{
    "kind" : "component",
    "contributions" : [
        {
        "id" : "<factory id>",
        "kind" : "factory",
        "type" : "function",
        "name" : "<readable function type name>",
        "description" : "<function type description>",
        "version" : "<SemVer-compatible version of module type, e.g. 1.0.0>",
        "url":"/functions",
        "keywords" : ["<keyword 1>", "<keyword 2>"},
        "icons" : [ {
            "url" : "<icon URL, e.g. public/img/icon64x64.png>",
            "size" : "64x64",
            "active" : true
        }]
        "multipleArgs" : false,
        "interfaces" : ["com.fico.dmp.functions.BusinessKnowledgeModel",
                        "com.fico.dmp.functions.DMPBoxcaringFunction"]
      "contributions": [
      {
      "kind" : "event",
      "name" : "user-friendly event type name",
      "description" : "...",
      "type": "Java class name or reference to a type declared in a schema provided in the component.json
      itself",
      "id": "event id/key under which this event will be inserted into DMPEntity's event map"
      },
                {"kind": "event", ...}
                ]
} ], }
```

It should be appreciated that an instance of a component that is generated based on a corresponding descriptor file can also have a descriptor file having the same and/or similar descriptor. However, the active flag in the factory contribution of this descriptor file may be set to false in order to indicate that no additional functions can be generated by this function factory. The decision management platform 110 can generate functions across multiple components based on the presence of active flags. Meanwhile, the multipleArgs flag can indicate if the function factory generates a function that intakes a single argument or multiple arguments. The contribution attribute can describe an optional set of event types that trigger the logging of event data by the function generated by the function factor.

As noted earlier, each function factory of a component is configured to generate a specific type of function. For example, a function factory can be configured to generate a function that implements a knowledge model, such as the knowledge model 230. A different function factory can be configured to generate a function that injects one or more data models. Alternately and/or additionally, a function factory can be configured to generate a binding function that maps and/or transforms between the output and inputs of various functions in a solution.

Referring again to FIG. 2A, the decision management platform 110 can support the deployment of the solution thermore, the decision management platform 110 can further call the resulting instance of the component to add, to the component, the decision tree underlying the knowledge model 230. The resulting component can then be deployed to any runtime and be executed as part of the running the solution associated with the graphical representation 200.

As noted earlier, a component can serve as a software container that encapsulates one or more functions as wells the supporting dependencies and/or artifacts required to execute the functions. Thus, generating a function and the corresponding component that host the function can encapsulate the function as part of software containers. In doing so, the decision management platform 110 is able to deploy the solution associated with the graphical representation 200 in any runtime, regardless of the underlying computing infrastructure. In some implementations of the current subject matter, the decision management platform 110 can also inject, into the component hosting one or more functions, additional services required for executing the functions in any runtime. For instance, the decision management platform 110 can inject security filters that ensure only authorized users are given access to a component and its constituent functions. The decision management platform 110 can further inject file data filters that ensure compliance with legal and/or organizational guidelines.

Figure 2B:
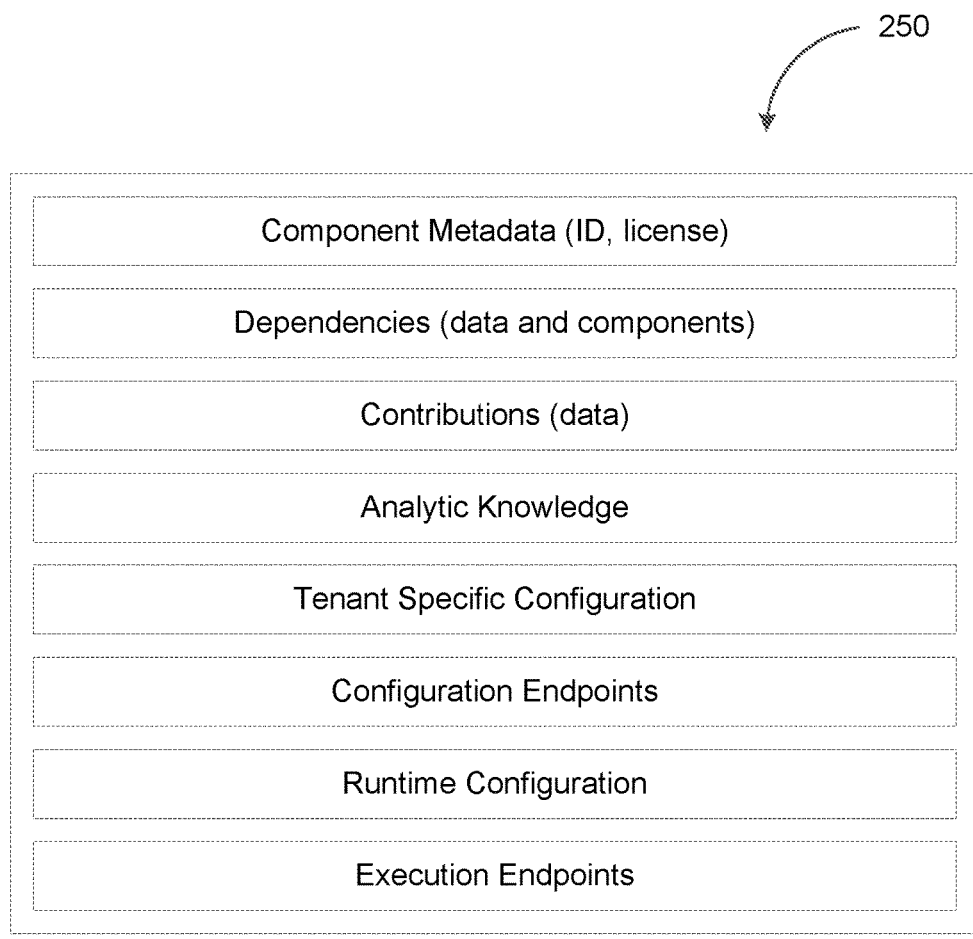
FIG. 2B depicts a block diagram illustrating a component consistent with implementations of the current subject matter.

FIG. 2B depicts a block diagram illustrating a component 250 consistent with implementations of the current subject matter. The decision management platform 110 can generate the component 250 in order to host one or more functions such as, for example, functions that implement any one of the first input 212, the second input 214, the first decision 222, the second decision 224, and the knowledge model 230. As shown in FIG. 2B, the component 250 can include metadata such as, for example, a component identifier, a component description, licenses, links to documentation, and/or the like. The component 250 can further include dependencies, input data, engine (e.g., Tomcat, JBOSS, and/or the like), services (e.g., Hadoop® Distributed File System, Couchbase, MySQL, and/or the like), contributions, output data, configuration endpoints, knowledge models, execution endpoints for decision invocation (e.g., Simple Object Access Protocol (SOAP) and/or Representational State Transfer (REST) endpoints), and functions. As used herein, functions may be smaller executional code (e.g., Java Archive (JAR)) that is able to execute a decision outside of a software container.

In some implementations of the current subject matter, the decision management platform 110 can deploy a solution by storing a snapshot of the solution to the repository 140. For instance, a user can publish the solution by at least interacting with the user interface 135 at the client 130. In response to the publishing of the solution, the decision management platform 110 can collect all of the functions that are exposed by the components generated for the solution and the corresponding artifacts. As noted earlier, the functions can be generated by corresponding function factories, which are configured to return the universal resource locator of the functions. As such, functions can be collected via a Hypertext Transfer Protocol (HTTP) REST call to the universal resource locator of each individual function. Calling the universal resource locator of a function can return the executable code for the function as well as the artifacts associated with the function. These artifacts can be captured, validated for correctness, and cached locally. Once all of the functions have been collected, the decision management platform 110 can upload the functions to a repository with a special solution descriptor (e.g., solution.js) that defines the snapshot in its entirety. Each individual function can be placed in a directory under the function snapshot, where the directory name corresponds to the identifier of the function returned by the function factory that generated the function. It should be appreciated that the functions can be linked via orchestrations such as, for example, Decision Model and Notation™ service definition and/or the like. Furthermore, the decision management platform 110 can also contribute its own function for managing the orchestration and execution of different functions.

The decision management platform 110 can further store the functions and the artifacts as a snapshot into the repository 140. According to some implementations of the current subject matter, the decision management platform 110 can store the snapshot to a location within the repository 140 (e.g., an AWS S3 bucket) that is specifically provisioned for the snapshot. That location within the repository 140 can serve as a deployment package 145 that enables the solution to be deployed to one or more runtimes including, for example, the first endpoint 150A and/or the second endpoint 150B. For example, a batch job that applies the solution to a batch of input values can be scheduled with the snapshot contained within the deployment package 145 as the definition of the batch job to be performed. Alternately and/or additionally, the deployment package 145 can also be made available over the network 120 such that the solution can be accessed as a web service.

Figure 3:
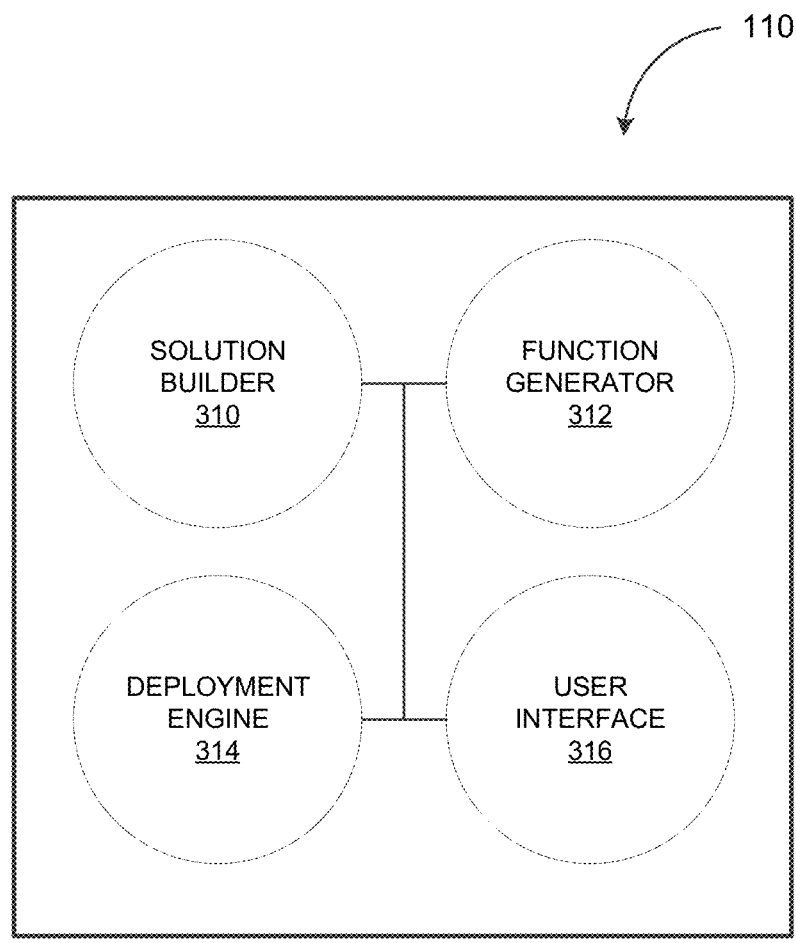
FIG. 3 depicts a block diagram illustrating a decision management platform consistent with implementations of the current subject matter.

FIG. 3 depicts a block diagram illustrating the decision management platform 110 consistent with implementations of the current subject matter. Referring to FIGS. 1 and 3, the decision management platform 110 can include a plurality of components including, for example, a solution builder 310, a function generator 312, a deployment engine 314, and a user interface 316.

In some implementations of the current subject matter, the solution builder 310 can be configured to support the development of a solution. For instance, the user of the client 130 can interact with the user interface 135 to develop a solution for processing credit card transactions. The solution can be developed based on a corresponding graphical representation, such as the graphical representation 200, which the solution builder 310 can provide to the client 130 via the user interface 135. It should be appreciated that the solution builder 310 can support any type of standard for graphically representing the solution including, for example, Decision Model and Notation™ (DMN™) and/or the like.

As noted earlier, the user can develop the solution by modifying the graphical representation of the solution including by modifying the nodes in the graphical representation and/or the edges connecting the nodes. Referring again to FIG. 2A, the user can generate the graphical representation 200, which can graphically portray the decision logic underlying the solution for processing credit card transactions. The nodes for the first input 212, the second input 214, the first decision 222, the second decision 224, the knowledge model 230, and the source 240 indicate the elements that are present in the decision logic. Meanwhile, the edges between the nodes can indicate the dependencies between two or more elements. For example, the second decision 224 can require the output from the first decision 222 which in turn requires applying the knowledge model 230 to both the first input 212 and the second input 214.

The function generator 312 can be configured to generate one or more functions for each of the nodes in the graphical representation of the solution. The generating of a function can include generating a component that is configured to host that type of function. For example, the function generator 312 can be configured to identify a component archetype for generating a component that can host the type of function. The identification of the component archetype can be performed based on the descriptor file (e.g., component.json) included in the component archetype. It should be appreciated that the function generator 312 can determine, based on the descriptor file, that the component archetype include a function factory that is configured to generate this specific type of function. The function generator 312 can subsequently generate, based on the component archetype, an instance of the component. Furthermore, the function generator 312 can invoke the function factory to generate the function. The resulting function can be added to the component, which serves as a software container for the function that enables the function to be deployed in any runtime. As noted earlier, the component can provide the complete filesystem required for running the function including, for example, the supporting dependencies and/or artifacts required to execute the functions.

The deployment engine 314 can be configured to deploy a solution to any runtime, regardless of the underlying computing infrastructure. For example, the deployment engine 314 can deploy the solution to a distributed computing system (e.g., a Spark® cluster) as a batch job configured to process a batch of input values. Alternately and/or additionally, deployment engine 314 can deploy the solution as a web service hosted by a serverless platform (e.g., Amazon® Web Services Lambda) and/or as a mobile application running on a mobile device.

In some implementations of the current subject matter, the deployment engine 314 can be configured to deploy a solution that has been published by the user via the user interface 135 on the client 130. The publishing the solution can prompt the deployment engine 314 to collect the functions and the artifacts associated with the solution, both of which can be exposed by the components that the function generator 312 had generated earlier. The deployment engine 312 can further deploy the solution by storing the functions and the artifacts as a snapshot into a repository, such as the repository 140. In particular, the deployment engine 312 can store the snapshot at a specific location within the repository 140 (e.g., an Amazon® Simple Storage Service (S3) bucket) that can serve as the deployment package 145 for the solution. As such, the solution can be deployed using the deployment package 145. For example, a batch job executing the solution to process a batch of input values can be scheduled with the deployment package 145 as the definition of the batch job to be performed. Alternately and/or additionally, the deployment package 145 can also be made available over the network 120 such that the solution can be accessed as a web service.

Deployment of the deployment package 145 to a runtime environment can trigger the start of a local executor that is specific to that particular runtime environment. For example, a Spark cluster can have a SparkExecutor while Amazon® AWS Lambda can have a LambdaExecutor. This local executor can use a library called FunctionExecutor to complete the deployment of the deployment package 145. Specifically, the FunctionExecutor can be configured to download the contents of the solution snapshot, the artifacts and implementation of each function, the descriptors for the overall function, and/or the like. The FunctionExecutor can further validate the individual configurations for each function. Furthermore, the FunctionExecutor can identify orchestration artifacts (e.g., provided by Decision Model and Notation™) and translate the orchestration artifacts (e.g., the Decision Model and Notation™ graph) into a suitable local representation using a depth-first traversal of the structure. The FunctionExecutor can insert appropriate transformation steps at various points. For instance, the FunctionExecutor can insert transformation steps for serializing and/or de-serializing input data from a third party data source. The FunctionExecutor can further execute the combined structure according to the requirements of the local executor. In Spark, for example, the FunctionExecutor can translate the graph into a structured DataFrame, DataSet, and/or Resilient Distributed Dataset (RDD) such that the contents of the deployment package 145 can be executed in a streaming and/or a batch context. By contrast, in Lambda, the FunctionExecutor can translate the graph into a tree containing different direct Java calls. This tree can be fed via streaming (e.g., Amazon® Kinesis) and/or web requests via an application programming interface (API) gateway.

In some implementations of the current subject matter, the deployment package 145 can be deployed to mobile device as a .zip file. For example, some mobile devices can be subject to manufacture restrictions that prevent the dynamic downloading of new content. As such, the deployment package 145 can be made available to the mobile device as a local zip file containing the complete repository.

The user interface 316 can be configured to provide one or more user interfaces, such as the user interface 135, which can be used to interact with the decision management platform 110. For example, the user interface 316 can generate the user interface 135 to enable the user of the client 130 to develop a solution. As such, the user interface 135 can display a graphical representation of the solution, such as the graphical representation 200 shown in FIG. 2A. The user interface 135 can further enable the user to modify the graphical representation of the solution by adding and/or removing the nodes in the graphical representation and/or the edges connecting the nodes. Alternately and/or additionally, the user interface 316 can generate the user interface 135 to enable the user of the client 130 to publish and/or deploy the solution. For instance, publishing the solution can prompt the decision management platform 110 to store a snapshot capturing the functions and/or artifacts forming the solution to the repository 140 as the deployment package 145. The solution can further be deployed from the repository 140 as a batch job, a web service, and/or a mobile application running on a mobile device.

Figure 4A:
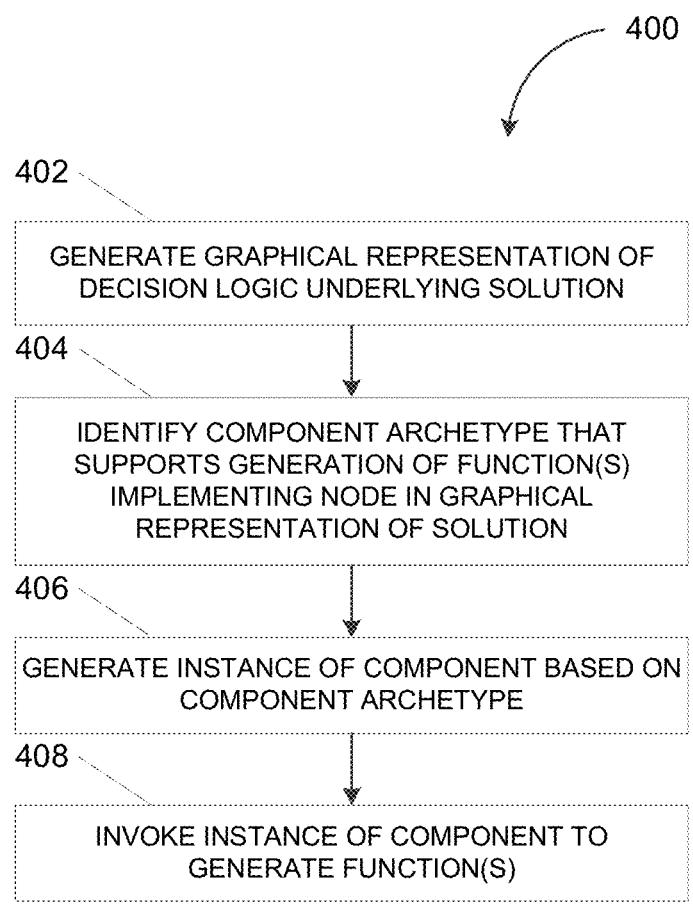
FIG. 4A depicts a flowchart illustrating a process for developing a solution consistent with implementations of the current subject matter.

FIG. 4A depicts a flowchart illustrating a process 400 for developing a solution consistent with implementations of the current subject matter. Referring to FIGS. 1-3 and 4A, the process 400 may be performed by the decision management platform 110.

The decision management platform 110 can generate a graphical representation of a decision logic underlying a solution (402). For example, the decision management platform 110 (e.g., the solution builder 310) can enable the user of the client 130 to develop a solution by modifying a graphical representation of the solution. Modifying the graphical representation of the solution can include adding and/or removing nodes and/or edges from the graphical representation. Alternately and/or additionally, modifying the graphical representation of the solution can include customizing an underlying knowledge model to include a customized predictive model, optimization algorithm, ruleset, decision tree, decisions table, scorecard, decision graph, and/or the like. It should be appreciated that the resulting graphical representation of the solution, such as the graphical representation 200, can set forth the decision logic underlying the solution. The graphical representation of the solution can include nodes that correspond to various elements of the decision logic including, for example, inputs, decisions, knowledge models, sources, and/or the like. Furthermore, the graphical representation of the solution can include edges that indicate the dependencies between the various elements of the decision logic.

The decision management platform 110 can identify a component archetype that supports the generation of at least one function implementing a node in the graphical representation of the solution (404). The component archetype of a component can include a descriptor file (e.g., component.json) that indicates the types of functions that are supported by the corresponding component, which is an instance of the component generated based on the component archetype. Specifically, the component archetype can include function factories that can be used to generate specific types of functions. As such, in some implementations of the current subject matter, the decision management platform 110 (e.g., the function generator 312) can identify, based on the descriptor file in each available component archetype, the appropriate component archetype. For example, the decision management platform 110 can identify, based on the descriptor file in each available component archetype, a component that supports generating a function implementing the knowledge model 230.

The decision management platform 110 can generate an instance of the component based at least on the component archetype (406). For example, the decision management platform 110 can generate, based on the component archetype, an instance of the component that supports the generation of the function implementing the knowledge model 230.

The decision management platform 110 can invoke the instance of the component to generate the at least one function (408). For example, the decision management platform 110 can invoke the instance of the component, specifically the function factory, to generate the function implementing the knowledge model 230. In doing so, the instance of the component can host the function implementing the knowledge model 230. That is, the component can provide the program code associated with the function as well as the complete filesystem required for executing the function including, for example, the supporting dependencies and/or artifacts required to execute the functions. As noted earlier, the component can serve as a software container for the function, thereby enabling the function to be deployed in any runtime regardless of the underlying computing infrastructure (e.g., distributed computing system, serverless platform, mobile device, and/or the like).

Figure 4B:
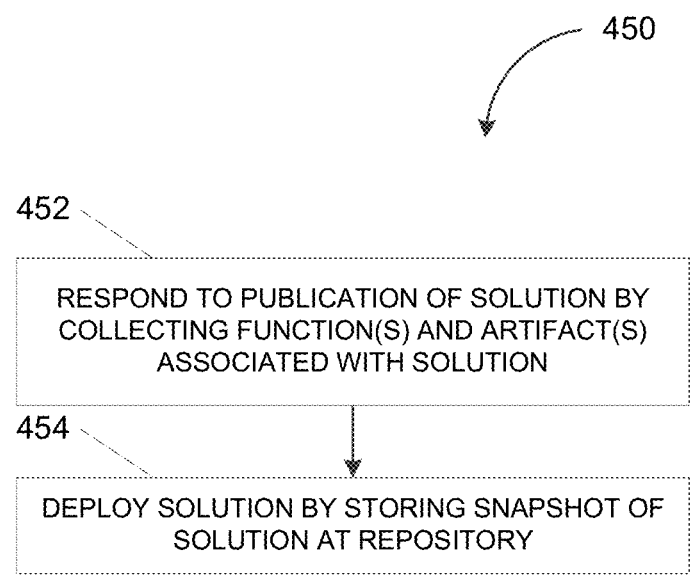
FIG. 4B depicts a flowchart illustrating a process for deploying a solution consistent with implementations of the current subject matter.

FIG. 4B depicts a flowchart illustrating a process 450 for deploying a solution consistent with implementations of the current subject matter. Referring to FIGS. 1-3 and 4B, the process 400 can be performed by the decision management platform 110.

The decision management platform 110 can respond to the publication of a solution by at least collecting the functions and the artifacts associated with the solution to generate a snapshot of the solution (452). For example, the user of the client 130 can publish a solution by interacting with the user interface 135. The publication of the solution can prompt the decision management platform 110 (e.g., the deployment engine 314) to collect all of the functions and artifacts associated with the solution, which can be exposed by the host components. These functions and artifacts can form a snapshot of the solution.

The decision management system 110 can deploy the solution by at least storing the snapshot of the solution at a repository (454). In some implementations of the current subject matter, the decision management platform 110 (e.g., the deployment engine 314) can deploy the solution by storing a snapshot of the solution (e.g., its constituent functions and artifacts) to the repository 140. The decision management platform 110 can store the snapshot at a specific location within the repository 140 (e.g., an Amazon® Simple Storage Service (S3) bucket) that has been provisioned for storing the snapshot. This location can serve as a deployment package, such as the deployment package 145, for the solution. For example, a batch job executing the solution to process a batch of input values can be scheduled with the deployment package 145 as the definition of the batch job to be performed. Alternately and/or additionally, the deployment package 145 can also be made available over the network 120 such that the solution can be accessed as a web service.

Figure 5:
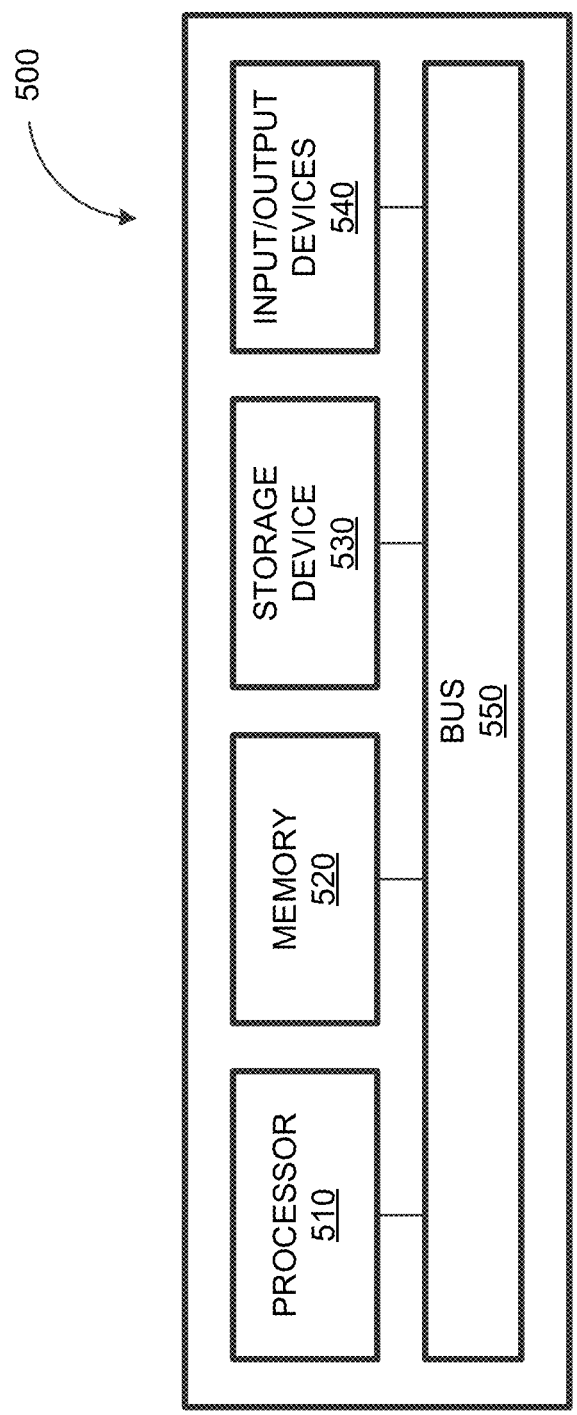
FIG. 5 depicts a block diagram illustrating a computing system consistent with some implementations of the current subject matter.

FIG. 5 depicts a block diagram illustrating a computing system 500, in accordance with some example embodiments. Referring to FIGS. 1 and 5, the computing system 500 can be used to implement the processors 102A-C, the sub-execution environment controller 105A-C, the decision management platform 110, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the decision management platform 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile random-access memory (RAM) that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In some of the example described above, an administrator is described. The administrator may represent a fully and/or or partially automated computer-based process.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few implementations have been described in detail above, other modifications or additions are possible. In particular, further features and/or implementations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claim.

What is claimed is:

1. A computer-implemented method, comprising:
    generating a graphical representation of a decision logic underlying a solution, the graphical representation having a plurality of nodes;
    identifying a component archetype that supports generating a function implementing one of the plurality of nodes in the graphical representation of the solution;
    generating, based at least on the component archetype, an instance of the component;
    generating the function by at least invoking the instance of the component, the generated function being hosted by the instance of the component; and
    deploying the generated function for execution in one or more runtime environments.

2. The computer-implemented method of claim 1, wherein the graphical representation is generated in accordance with a Decision Model and Notation™ (DMN™) standard.

3. The computer-implemented method of claim 1, wherein the plurality of nodes forms a directed acyclic graph indicating one or more dependencies between the plurality of nodes.

4. The computer-implemented method of claim 1, wherein the function implements a knowledge model.

5. The computer-implemented method of claim 4, wherein the knowledge model comprises one or more predictive models, optimization algorithms, business and operational rules, decision trees, decisions tables, scorecards, and/or decision graphs.

6. The computer-implemented method of claim 1, wherein the instance of the component hosts the function by serving as a software container that encapsulates program code associated with the function and a complete filesystem required for executing the function.

7. The computer-implemented method of claim 1, wherein the component archetype includes resources for instantiating the instance of the component, the resources including a descriptor file, one or more implementation artifacts, and documentation.

8. The computer-implemented method of claim 7, wherein the component archetype is identified based at least on the descriptor file.

9. The computer-implemented method of claim 1, wherein the component archetype further includes programming code configured to generate the function.

10. The computer-implemented method of claim 9, wherein the invoking of the instance of the component comprises executing the programming code configured to generate the function.

11. A system, comprising:
at least one data processor; and
at least one memory storing instructions which, when executed by the at least one data processor, result in operations comprising:
generating a graphical representation of a decision logic underlying a solution, the graphical representation having a plurality of nodes;
identifying a component archetype that supports generating a function implementing one of the plurality of nodes in the graphical representation of the solution;
generating, based at least on the component archetype, an instance of the component;
generating the function by at least invoking the instance of the component, the generated function being hosted by the instance of the component; and
deploying the generated function for execution in one or more runtime environments.

12. The system of claim 11, wherein the graphical representation is generated in accordance with a Decision Model and Notation™ (DMN™) standard.

13. The system of claim 11, wherein the plurality of nodes forms a directed acyclic graph indicating one or more dependencies between the plurality of nodes.

14. The system of claim 11, wherein the function implements a knowledge model.

15. The system of claim 14, wherein the knowledge model comprises one or more predictive models, optimization algorithms, business and operational rules, decision trees, decisions tables, scorecards, and/or decision graphs.

16. The system of claim 11, wherein the instance of the component hosts the function by serving as a software container that encapsulates program code associated with the function and a complete filesystem required for executing the function.

17. The system of claim 11, wherein the component archetype includes resources for instantiating the instance of the component, the resources including a descriptor file, one or more implementation artifacts, and documentation.

18. The system of claim 17, wherein the component archetype is identified based at least on the descriptor file.

19. The system of claim 11, wherein the component archetype further includes programming code configured to generate the function, the invoking of the instance of the component comprises executing the programming code configured to generate the function.

20. A non-transitory computer-readable storage medium including program code, which when executed by at least one data processor, cause operations comprising:
generating a graphical representation of a decision logic underlying a solution, the graphical representation having a plurality of nodes;
identifying a component archetype that supports generating a function implementing one of the plurality of nodes in the graphical representation of the solution;
generating, based at least on the component archetype, an instance of the component;
generating the function by at least invoking the instance of the component, the generated function being hosted by the instance of the component; and
deploying the generated function for execution in one or more runtime environments.

* * * * *